US007002746B2

(12) United States Patent
Schilling et al.

(10) Patent No.: US 7,002,746 B2
(45) Date of Patent: Feb. 21, 2006

(54) SECURITY ELEMENT COMPRISING MACROSTRUCTURES

(75) Inventors: Andreas Schilling, Hagendorn (CH); Wayne Robert Tompkin, Baden (CH); René Staub, Hagendorn (CH)

(73) Assignee: OVD Kinegram AG, Zug (CH)

( * ) Notice: Subject to any disclaimer, the term of this patent is extended or adjusted under 35 U.S.C. 154(b) by 0 days.

(21) Appl. No.: 10/510,114

(22) PCT Filed: Apr. 3, 2003

(86) PCT No.: PCT/EP03/03483

§ 371 (c)(1),
(2), (4) Date: Oct. 4, 2004

(87) PCT Pub. No.: WO03/084766

PCT Pub. Date: Oct. 16, 2003

(65) Prior Publication Data

US 2005/0163922 A1 Jul. 28, 2005

(30) Foreign Application Priority Data

Apr. 5, 2002 (DE) ................................ 102 16 561

(51) Int. Cl.
*G02B 5/18* (2006.01)

(52) U.S. Cl. ....................... 359/569; 359/573; 359/566

(58) Field of Classification Search ................ 359/569, 359/573, 567, 566, 2
See application file for complete search history.

(56) References Cited

U.S. PATENT DOCUMENTS

| | | | |
|---|---|---|---|
| 4,469,725 A | 9/1984 | Fischer et al. | |
| 4,677,285 A | 6/1987 | Taniguchi | |
| 4,856,857 A | 8/1989 | Takeuchi et al. | |
| 4,874,213 A | 10/1989 | Cowan | |
| 5,714,213 A | 2/1998 | Antes et al. | |
| 5,801,857 A * | 9/1998 | Heckenkamp et al. | 359/2 |
| 6,909,547 B1 * | 6/2005 | Weiteneder et al. | 359/569 |
| 2004/0070803 A1 * | 4/2004 | Decker et al. | 359/15 |
| 2005/0104364 A1 * | 5/2005 | Keller et al. | 283/72 |

FOREIGN PATENT DOCUMENTS

| | | |
|---|---|---|
| CH | 690 232 AS | 6/2000 |
| DE | 27 01 176 B1 | 12/1977 |
| DE | 100 28 426 A1 | 4/2001 |
| EP | 0 105 099 A1 | 4/1984 |
| EP | 0 375 833 A1 | 7/1990 |
| EP | 0 429 782 B1 | 5/1994 |
| GB | 2 129 739 A | 5/1984 |
| GB | 2 219 248 A | 12/1989 |
| WO | WO 88/085387 | 7/1988 |

* cited by examiner

*Primary Examiner*—Fayez G. Assaf
(74) *Attorney, Agent, or Firm*—Hoffmann & Baron, LLP

(57) ABSTRACT

A security element for sticking onto a document comprises a layer composite of plastic material and has embedded, optically effective structures of a pattern . The optically effective structures in surface portions of the pattern are in a reference plane, defined by co-ordinate axis (x; y), of the layer composite and are shaped into a reflecting interface. The interface is embedded between a transparent shaping layer and a protective layer of the layer composite. At least one surface portion is of a dimension of greater than 0.4 mm and in the interface has at least one shaped macrostructure which is an at least portion-wise steady and differentiatable function of the co-ordinates (x; y). The macrostructure is curved at least in partial regions and is not a periodic triangular or rectangular function. In the surface portion adjacent extreme values of the macrostructure are at least 0.1 mm away from each other. Upon illumination of the pattern with light an optically variable pattern of light reflection phenomena is visible on the security element upon changing the viewing direction.

12 Claims, 3 Drawing Sheets

SECURITY ELEMENT COMPRISING MACROSTRUCTURES

CROSS-REFERENCE TO RELATED APPLICATIONS

This application is a National Phase application, which claims priority based on International Application No. PCT/EP2003/003483, filed on Apr. 3, 2003, which claims priority based on German Patent Application No. 102 16 561.0, filed on Apr. 5, 2002, which are incorporated herein by reference.

BACKGROUND OF THE INVENTION

The invention relates to a security element having macrostructures as set forth in the classifying portion of claim 1.

Such security elements comprise a thin layer composite of plastic material, wherein at least light-modifying relief structures and flat mirror surfaces are embedded into the layer composite. The security elements which are cut out of the thin layer composite are stuck onto articles for verifying the authenticity of the articles.

The structure of the thin layer composite and the materials which can be used for same are described for example in U.S. Pat. No. 4,856,857. It is also known from GB 2 129 739 A for the thin layer composite to be applied to an article by means of a carrier film.

An arrangement of the kind set forth in the opening part of this specification is known from EP 0 429 782 B1. In that case the security element which is stuck onto a document has an optically variable surface pattern which is known for example from EP 0 105 099 A1 or EP 0 375 833 A1 and which comprises surface portions arranged mosaic-like with known diffraction structures and other light-modifying relief structures. So that a forged document, for faking apparent authenticity, cannot be provided without clear traces with a counterfeited security element which has been cut out of a genuine document or detached from a genuine document, security profiles are embossed into the security element and into adjoining portions of the document. The operation of embossing the security profiles interferes with recognition of the optically variable surface pattern. In particular the position of the embossing punch on the security element varies from one example of the document to another.

It is also known that, in earlier times, in the case of particularly important documents, the authenticity of the document was verified by a seal applied thereto. The seal involves a relief image of a complicated and expensive configuration.

SUMMARY OF THE INVENTION

The object of the invention is to provide an inexpensive security element having a novel optical effect, which comprises a thin layer composite and which is to be secured to the article to be verified.

In accordance with the invention that object is attained by a security element comprising a layer composite which is disposed in a reference plane defined by co-ordinate axes (x; y) and which comprises a shaping layer of plastic material and a protective layer of plastic material with embedded optically effective structures which form a pattern and which are shaped in surface portions of the pattern into the shaping layer and form a reflecting interface embedded between the transparent shaping layer and the protective layer of the layer composite and at least a surface portion of dimensions greater than 0.4 mm at the interface as an optically effective structure has at least one shaped macrostructure (M) with adjacent extreme values which are at least 0.1 mm away from each other, and that the macrostructure (M) is an at least portion-wise steady and differentiatable function of the co-ordinates (x; y) curved at least in partial regions and is not a periodic triangular or rectangular function.

Advantageous configurations of the invention are set forth in the appendant claims.

BRIEF DESCRIPTION OF THE DRAWINGS

Embodiments by way of example of the invention are described in greater detail hereinafter and illustrated in the drawing in which.

DESCRIPTION OF THE PREFERRED INVENTION

Figure 1:
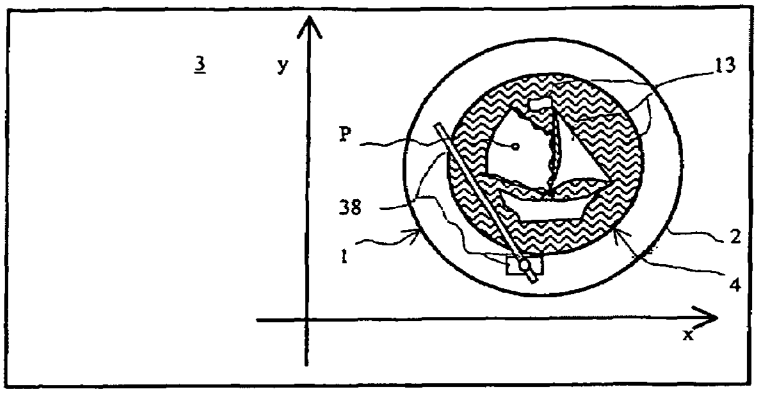
FIG. 1 shows a security element on a document.

Referring to FIG. 1, reference 1 denotes a layer composite, 2 a security element and 3 a document. In the layer composite 1 the security element 2 has a macrostructure M which extends in the region of a pattern 4. The security element 2 is arranged in a notional reference plane defined by the co-ordinate axes x, y. The macrostructure M is a one-to-one, portion-wise steady and differentiatable function M(x, y) of the co-ordinates x, y. The function M(x, y) describes a surface which is curved at least in partial regions, wherein in partial regions $\Delta M(x, y) \neq 0$. The macrostructure M is a three-dimensional surface, wherein x, y are the co-ordinates of a point P(x, y) on the surface of the macrostructure M.

The spacing z(x, y) of the point P(x, y) from the reference plane is measured parallel to the co-ordinate axis x which is perpendicular to the plane of the drawing in FIG. 1. In an embodiment the pattern 4 is surrounded by a surface pattern 38 with the light-modifying structures known from above-mentioned EP 0 375 833 A1 such as for example a flat mirror surface, light-diffracting, microscopically fine grating structures, matt structures and so forth. In particular in an embodiment the surface of the pattern 4 is subdivided raster-like as shown in FIG. 1 of above-mentioned EP 0 375 833 A1, with each raster element being subdivided at least into two field components. Shaped in one of the field components is the corresponding component of the function M(x, y), while for example mosaic elements of the surface pattern 38 are shaped in the other one. In another embodiment, narrow line elements and/or other mosaic elements of any shape of the surface pattern 38 are arranged on the pattern 4. The line and mosaic elements are advantageously of a dimension in the range of between 0.05 mm and 1 mm in one direction. In a further embodiment the security element 2 is transparent in an edge zone outside the pattern 4.

Figure 2:
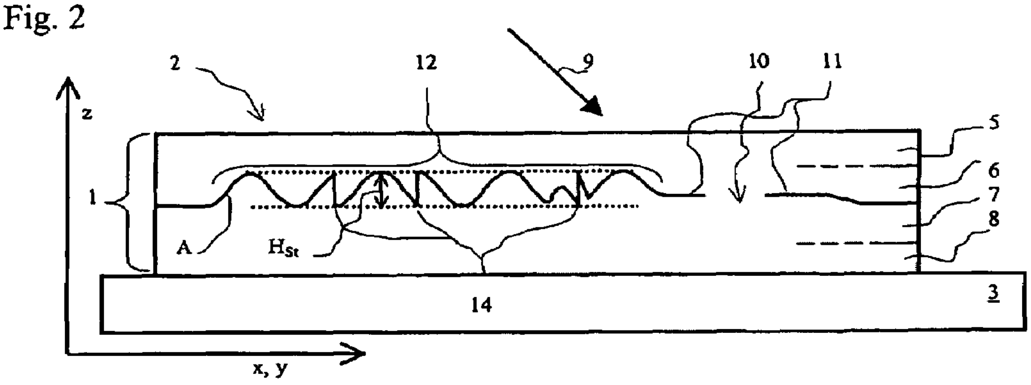
FIG. 2 shows a cross-section through a layer composite.

FIG. 2 shows a cross-section through the layer composite 1 when stuck onto the document 3. The layer composite 1 comprises a plurality of layer portions of varying plastic layers which are applied in succession to a carrier film (not shown here) and typically includes in the specified sequence a cover layer 5, a shaping layer 6, a protective layer 7 and an adhesive layer 8. At least the cover layer 5 and the shaping layer 6 are transparent in relation to incident light 9. The pattern 4 is visible through the cover layer 5 and the shaping layer 6.

If the protective layer 7 and the adhesive layer 8 are also transparent, indicia (not shown here) which are applied to the surface of the substrate 3 can be seen through transparent locations 10. The transparent locations 10 are disposed for example within the pattern 4 and/or in the edge zone of the security element 2, which surrounds the pattern 4. In an embodiment the edge zone is completely transparent while in another embodiment it is transparent only at predetermined transparent locations 10. In an embodiment the carrier film can be the cover layer 5 itself while in another embodiment the carrier film serves for application of the thin layer composite 1 to the substrate 3 and is thereafter removed from the layer composite 1, as described in above-mentioned GB 2 129 739 A.

The common contact face between the shaping layer 6 and the protective layer 7 is the interface 11. The optically effective structures 12 of the macrostructure M of the pattern 4 (FIG. 1) are shaped with a structural height $H_{St}$ into the shaping layer 6. As the protective layer 7 fills the valleys of the optically effective structures 12 the function M(x, y) describes the interface 11. In order to achieve a high level of effectiveness in respect of the optically effective structures 12 the interface 11 can be formed by a metal coating, preferably comprising the elements from Table 5 of above-mentioned U.S. Pat. No. 4,856,857, in particular aluminum, silver, gold, copper, chromium, tantalum and so forth which as a reflection layer separates the shaping layer 6 and the protective layer 7. The electrical conductivity of the metal coating affords a high level of reflection capability in relation to visible incident light 9 at the interface 11. However, instead of the metal coating, one or more layers of one of the known transparent inorganic dielectrics which are listed for example in Tables 1 and 4 of above-mentioned U.S. Pat. No. 4,856,857 are also suitable, or the reflection layer has a multi-layer interference layer such as for example a double-layer metal-dielectric combination, a metal-dielectric-metal-combination and so forth. In an embodiment the reflection layer is structured, that is to say it only partially covers the interface 11 and leaves the interface 11 exposed at the predetermined transparent locations 10.

The layer composite 1 is produced as a plastic laminate in the form of a long film web with a plurality of mutually juxtaposed copies of the pattern 4. The security elements 2 are for example cut out of the film web and joined to the document 3 by means of the adhesive layer 8. Documents 3 embrace banknotes, bank cards, passes or identity cards or other important or valuable articles.

The macrostructure M(x, y) is composed for simple patterns 4 from one or more surface portions 13 (FIG. 1), wherein the macrostructures M(x, y) are described in the surface portions 13 by mathematical functions, such as for example $M(x, y)=0.5\cdot(x^2+y^2)\cdot K$, $M(x, y)=a\cdot\{1+\sin(2\pi F_x\cdot x)\cdot\sin(2\pi F_y\cdot y)\}$, $M(x, y)=a\cdot x^{1.5}+b\cdot x$, $M(x, y)=a\cdot\{1+\sin(2\pi F_y\cdot y)\}$, wherein $F_x$ and $F_y$ are respectively a spatial frequency F of the periodic macrostructure M(x, y) in the direction of the co-ordinate axis x and y respectively. In another embodiment of the pattern 4 the macrostructure M(x, y) is composed periodically from a predetermined portion of another mathematical function and has one or more periods in the surface portion 13. The spatial frequencies F are of a value of at most 20 lines/mm and are preferably below a value of 5 lines/mm. The dimensions of the surface portion 13 are greater than 0.4 mm at least in one direction so that details in the pattern 4 are perceptible with the naked eye.

In another embodiment one or more of the surface portions 13 form a relief image as the pattern 4, in which case the interface 11, instead of the simple mathematical functions of the macrostructure M, follows the surface of the relief image. Examples of the pattern 4 are to be found on cameos or embossed images such as seals, coins, medals and so forth. The macrostructure M of the surface of the relief image is portion-wise steady and differentiatable and is curved in the partial regions thereof.

In further embodiments the macrostructure M reproduces other visible three-dimensional surface qualities, for example textures of almost periodic weaves or networks, a plurality of relatively simply structured bodies in a regular or irregular arrangement, and so forth. The enumeration of the macrostructures M which can be used is incomplete as a multiplicity of the macrostructures M is portion-wise steady and differentiatable and at least in partial regions $\Delta M(x, y)\neq 0$.

The layer composite 1 may not be applied too thickly to the document 3. On the one hand the documents 3 would otherwise be difficult to stack and on the other hand a thick layer composite 1 would afford an engagement surface for detaching the layer composite 1 from the document 3. The thickness of the layer composite varies in accordance with the predetermined use and is typically in the range of between 3 $\mu$m and about 100 $\mu$m. The shaping layer 6 is only a part of the layer composite 1 so that a structural height $H_{St}$, which is admissible from the point of view of the structure of the layer composite 1, in relation to the macrostructure M which is shaped into the shaping layer 6, is limited to values below 40 $\mu$m. In addition the technical difficulties involved in shaping the macrostructure M increase with an increasing structural height so that preferred values in respect of the structural height $H_{St}$ are less than 5 $\mu$m. The profile height h in respect of the macrostructure M is the difference between a value z=M(x, y) at the point P(x, y) in relation to the reference plane and the value $z_0=M(x_0, y_0)$ at the location $P(x_0, y_0)$ of the minimum spacing $z_0$ relative to the reference plane, that is to say the profile height $h=z(x, y)-z_0$.

The drawing which is not true to scale in FIG. 2 illustrates by way of example the interface 11 as a shaping structure A which is shaped in the shaping layer 6, with the optically effective structures 12 and a relief height $h_R$. The shaping structure A is a function A(x; y) of the co-ordinates x and y. The height of the layer composite 1 expands along the co-ordinate axis z. As the macrostructure M to be shaped can exceed the predetermined value of the structural height $H_{St}$ the profile height h of the macrostructure M is to be limited at each point P(x, y) of the pattern 4 to the predetermined variation value H of the shaping structure A. As soon as the profile height h of the macrostructure M exceeds the value H, the value H is advantageously subtracted from the profile height h until the relief height $h_R$ of the shaping structure A is less than the value H, that is to say $h_R$= profile height h modulo value H. Accordingly the macrostructures M are also to be shaped with high values in respect of the profile height h in the layer composite 1 which is a few micrometers thick, in which case discontinuity locations 14 produced for technical reasons occur in the shaping structure A.

The discontinuity locations 14 of the shaping structure $$A(x;\,y)=\{M(x;\,y)+C(x;\,y)\}\text{ modulo value }H-C(x;\,y)$$

are therefore not extreme values in respect of the superimposition function M(x; y). In that respect the function C(x; y) is limited in amount to a range of values, for example to half the value of the structural height $H_{St}$. Equally in certain configurations of the pattern 4, for technical reasons, the values in respect of H may locally differ. The value H of the shaping structure A is limited to less than 30 μm and is preferably in the range of between H=0.5 μm and H=4 μm. In an embodiment of the diffraction structure S(x; y) the locally varying value H is determined by virtue of the fact that the spacing between two successive discontinuity locations $P_n$ does not exceed a predetermined value from the range of between 40 μm and 300 μm.

The shaping structure A is identical to the macrostructure M between two adjacent discontinuity locations 14 except for a constant value. Therefore the shaping structure A, with the exception of shadowing, produces to a good approximation the same optical effect as the original macrostructure M. Therefore the illuminated pattern 4, upon being considered with tilting and/or rotation of the layer composite 1 in the reference plane, behaves like the relief image or a three-dimensional surface described by the macrostructure M, although the layer composite 1 is only a few micrometers thick.

Figure 3:
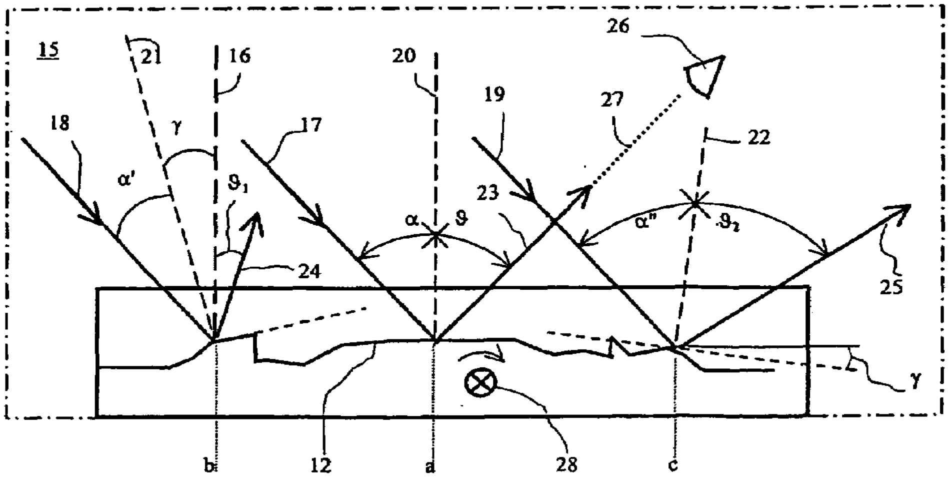
FIG. 3 shows reflection at a macrostructure.

Reference is made to FIG. 3 to describe how the light 9 (FIG. 2) which is directed in parallel relationship and which is incident on the interface 11 (FIG. 1) with the shaping structure A is reflected by the optically effective structure 12 and deflected in a predetermined manner. The reflection layer used is for example in the form of a layer of aluminum which is about 30 nm thick. Refraction of the incident light 9 and the reflected light at the boundaries of the layer composite 1 is not shown in the drawing in FIG. 3 for the sake of simplicity and is not taken into consideration in the calculations hereinafter. The incident light 9 is incident on the optically effective structure 12 in the layer composite 1 in a plane of incidence 15 which contains a normal 16 to the reference plane or to the surface of the layer composite 1. Parallel illumination beams 17, 18, 19 of the incident light 9 impinge on surface elements of the shaping structure A, for example at the locations identified by a, b and c. Each of the surface elements has a local inclination γ and a surface normal 20, 21, 22 in the plane of incidence 15, which are determined by the component of grad M(x, y). In the first surface element at the location a which has a local inclination $\gamma=0°$, the first illumination beam 17 includes an angle of incidence α with the first surface normal 20 and the light 9 which is reflected upon impinging on the first surface element is reflected as a first beam 23 in symmetrical relationship with the surface normal 20 at the angle of reflection $\alpha=\theta$. In the case of the second surface element at the location b the local inclination is $\gamma\neq0°$. The normal 16 and the second surface normal 21 include the angle $\gamma>0°$. The angle of incidence of the second illumination beam 18 at the second surface element is $\alpha'=\alpha-\gamma$ and accordingly the reflected second beam 24 includes the angle $\theta_1=\alpha-2\gamma$ with the normal 16. Likewise the reflected third beam 25 is deflected in accordance with the local inclination $\gamma<0°$ of the location c at the angle $\theta_2=\alpha-2\gamma=\alpha+2|\gamma|$ as the angle of incidence α" of the third illumination beam 19 relative to the third surface normal 22 is larger by the local angle of inclination γ than the angle of incidence relative to the normal 16. An observer 26 who is viewing in the viewing direction 27 which is for example in the plane of incidence 15 receives with his naked eye the reflected light of the beams 23, 24, 25 only if, as a consequence of tilting of the security element 2 (FIG. 1) or the layer composite 1 about an axis 28 which is disposed in the reference plane and which is oriented perpendicularly to the plane of incidence 15 the beams 23, 24, 25 reflected at the various angles θ, $\theta_1$, $\theta_2$ relative to the normal 16 coincide with his viewing direction 27. At a given tilt angle the observer 26 perceives the surface elements of the macrostructure M with a high level of surface brightness, which have the same local inclination 7 in the plane of incidence 15 and in planes parallel thereto respectively. Although the interface 11 in itself is smooth, the other surface elements of the macrostructure M can also scatter some light in parallel relationship with the viewing direction 27 and they appear to the observer 26 as being shaded to varying degrees according to the local inclination. The observer 26 has a plastic image impression although the shaping structure A is at most a few micrometers high. That scatter action can be increased by the superimposition of the macrostructure M with a matt structure, and can be used controlledly for the configuration of the security feature 2.

Figure 4A:
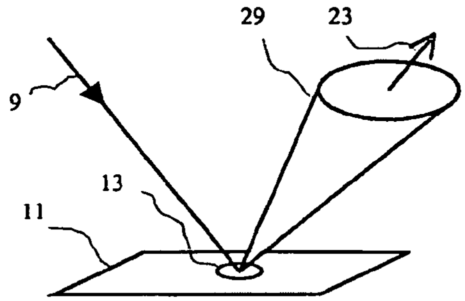
FIG. 4 shows scatter at matt structures.
Figure 4B:
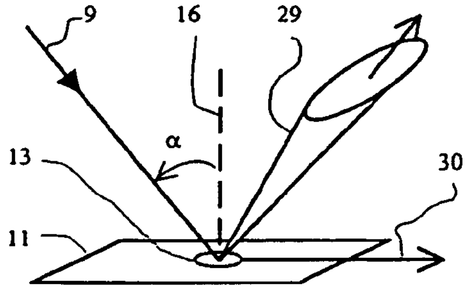

FIGS. 4a and 4b show the differing scatter characteristics of the surface portion 13 of the security element 2 in relation to the incident light 9. The matt structures have a microscopically fine, stochastic structure in the interface 11 and are described by a relief profile R, a function of the coordinates x and y. As shown in FIG. 4a the matt structures scatter the light 9 which is parallel in incident relationship into a scatter cone 29 with a spread angle which is predetermined by the scatter capability of the matt structure, and with the direction of the reflected light 23 as the axis of the cone. The intensity of the scatter light is for example at its greatest on the axis of the cone and decreases with increasing distance in relation to the axis of the cone, in which respect the light which is deflected in the direction of the generatrices of the scatter cone is still just perceptible to an observer. The cross-section of the cone 29 perpendicularly to the axis thereof is rotationally symmetrical, with the incidence of light being perpendicular, in the case of a matt structure which is here referred to as "isotropic". If, as shown in FIG. 4b, the cross-section of the scatter cone 29 is in contrast upset, that is to say elliptically deformed, in a preferred direction 30, the short major axis of the ellipse being oriented in parallel relationship with the preferred direction 30, the matt structure is referred to here as "anisotropic". The cross-section of the scatter cone 29 both in the case of the "isotropic" matt structure and also in the case of the "anisotropic" matt structure which is arranged parallel to the reference plane is noticeably distorted in a direction in parallel relationship with the plane of incidence 15 (FIG. 3) if the angle of incidence α relative to the normal 16 is greater than 30°.

The matt structures have relief structure elements (not shown here) which are fine on the microscopic scale and which determine the scatter capability and which can only be described with statistical parameters such as for example mean roughness value $R_a$, correlation length $l_c$ and so forth, in which respect the values in respect of the mean roughness value $R_a$ are in the range of between 200 nm and 5 μm, with preferred values between $R_a$=150 nm and $R_a$=1.5 μm. The correlation lengths $l_c$, at least in one direction, involve values in the range of between $l_c$=300 nm and $l_c$=300 μm, preferably between $l_c$=500 nm and $l_c$=100 μm. In the case of the "anisotropic" matt structures the relief structure elements are oriented in parallel relationship with the preferred direction 30. The "isotropic" matt structures have statistical parameters which are independent of direction and therefore do not have a preferred direction 30.

In another embodiment the reflection layer comprises a colored metal or the cover layer 5 (FIG. 2) is colored and transparent. The use of one of the multi-layer interference layers on the interface 11 is particularly effective as, due to the curvatures of the macrostructure M, the interference layer is of varying thicknesses in the direction of the viewing direction 27 and therefore appears in locally different colors which are dependent on the tilt angle 28. An example of the interference layer includes a $TiO_2$ layer which is between 100 nm and 150 nm between a transparent metal layer of 5 nm Al and an opaque metal layer of about 50 nm Al, the transparent metal layer facing towards the shaping layer 6.

Figure 5:
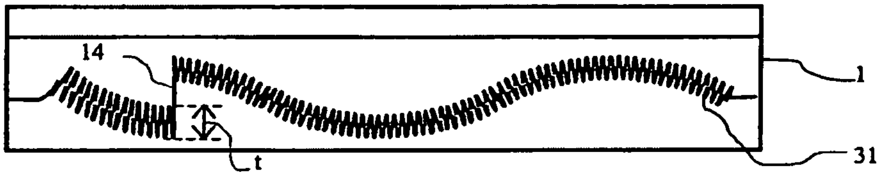
FIG. 5 shows the additive superimposition of the macrostructure with a diffraction grating.

FIG. 5 is a view in cross-section through the layer composite 1 showing a further embodiment of the macrostructure M. A submicroscopic diffraction grating 31 is additively superimposed on the macrostructure M at least in a surface portion 13 (FIG. 4*a*). The diffraction grating 31 has the relief profile R of a periodic function of the co-ordinates x (FIG. 2) and y (FIG. 2) and has a constant profile. The profile depth t of the diffraction grating 31 is of a value from the range of between t=0.05 $\mu$m and t=–5 $\mu$m, the preferred values being in the narrower range of t=0.6±0.5 $\mu$m. The spatial frequency f of the diffraction grating 31 is in the range above f=2400 lines/mm, hence the designation of submicroscopic. The submicroscopic diffraction grating 31 diffracts the incident light 9 (FIG. 4*a*) only into the zero diffraction order, that is to say in the direction of the beam 23 (FIG. 3) of the reflected light, in a portion from the visible spectrum, which is dependent on the spatial frequency f. The shaping structure A=(macrostructure M modulo value H)+relief profile R therefore produces the effect of a colored curved mirror. If the profile depth t of the diffraction grating 31 is sufficiently small <50 nm), that involves a smooth mirror surface which reflects the incident light 9 achromatically as an interface 11 (FIG. 2). Outside the discontinuity locations 14 the macrostructure M changes slowly in comparison with the submicroscopic diffraction grating 31 which extends in the surface portion 13 with a constant relief height over the macrostructure M.

Figure 6:
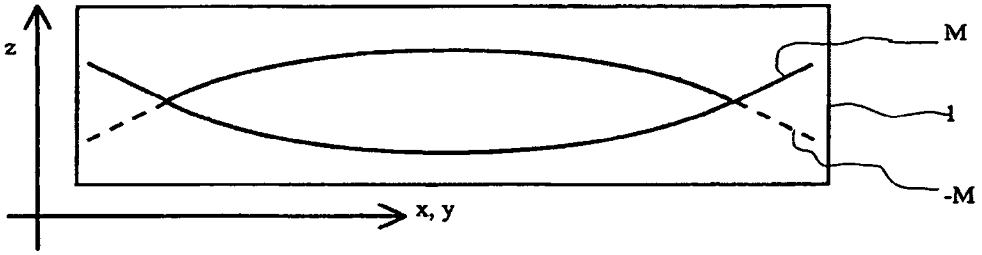
FIG. 6 shows a cross-section of two macrostructures of a security element.

FIG. 6 shows a view in cross-section through the layer composite 1 with a further embodiment of the security element 2 (FIG. 2). The security element 2 includes at least surface portions 13 (FIG. 4*a*) which are arranged one behind the other in the drawing in FIG. 6. The macrostructure M in the front surface portion 13 is in accordance for example with the mathematical function $M(y)=0.5\cdot y^2\cdot K$ and the macrostructure M in the rear surface portion 13 is determined by the function $M(y)=-0.5\cdot y^2\cdot K$. In the rear surface portion 13 parts of the macrostructure $M(y)=-0.5\cdot y^2\cdot K$ are concealed by the macrostructure $M(y)=0.5\cdot y^2\cdot K$ in the front surface portion 13 and are therefore shown in broken line in FIG. 6.

Figure 7:
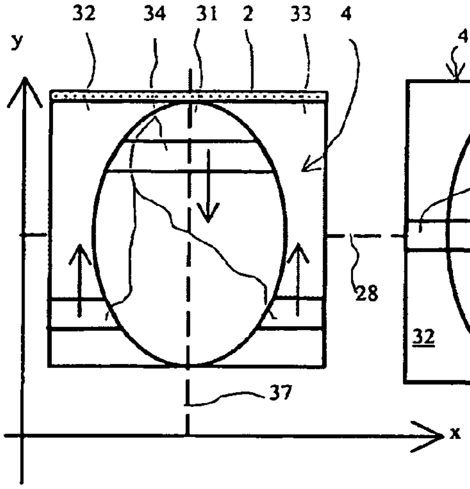
FIG. 7 shows a security element at different tilt angles.
Figure 7B:
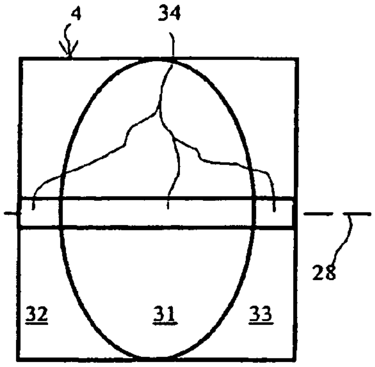
Figure 7C:
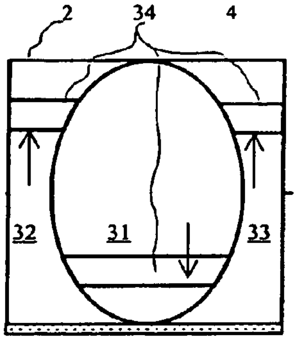

In elevation the pattern 4 (FIG. 1) in the security element 2, as shown in FIGS. 7*a* through 7*c*, has an oval first surface portion 31 with the macrostructure $M(y)=0.5\cdot y^2\cdot K$ shown in FIG. 6 while the macrostructure $M(y)=-0.5\cdot y^2\cdot K$ associated with the rear surface portion 13 (FIG. 4*a*) is shaped in second and third surface portions 32 and 33 adjoining the first surface portion 31. The constant K is the magnitude of the curvature of the macrostructure M. The gradients of the macrostructure M, grad(M), in the surface portions 31, 32, 33 are oriented in substantially parallel relationship with the y/z-plane. Preferably the gradients include an angle $\phi=0°$ and 180° respectively with the y/z-plane. The co-ordinate axis z is in perpendicular relationship to the plane of the drawing in FIG. 7*a*. In that respect, deviations in the angle $\phi$ of $\delta\phi=\pm30°$ to the preferred value are admissible in order in that range to view the gradient as being substantially parallel to the y/z-plane.

Upon illumination of the security element 2 with parallel incident light 9 (FIG. 4*a*) closely delimited strips 34 of the surface portions 31, 32, 33 in the pattern 4 project the reflected light with a high level of surface brightness in the viewing direction 27 (FIG. 3) of the observer 26 (FIG. 3). The strips 34 are oriented in perpendicular relationship to the gradients. For the sake of simplicity the gradients and therefore the strips 34 are parallel. The smaller the radius K, the correspondingly higher is the speed of movement of the strips 34 per unit of angle in the direction of the components 35, 36, which are projected onto the reference plane, of the gradients, upon rotation about the tilt axis 28. The width of the strips 34 depends on the local curvature K and the nature of the interface 11 (FIG. 2) of the shaping structure A used. With curvature of the same magnitude the strips 34 for the reflecting interfaces 11 are rather narrow in comparison with the strips 34 of the interfaces 11 with the microscopically fine matt structure. Outside the strips 34 the surface portions 31, 32, 33 are visible in a gray shade. A section along a track 37 is the cross-section shown in FIG. 6.

FIG. 7*b* shows the security element 2 after rotation about the tilt axis 28 into a predetermined tilt angle at which the strips 34 in the pattern 4 (FIG. 1) on the second and third surface portions 32, 33 and on the first surface portion 31 are on a line parallel to the tilt axis 28. That predetermined tilt angle is determined by the choice and the positioning of the macrostructures M. In an embodiment of the security element 2, a predetermined character is to be seen on the surface pattern surrounding the pattern 4, only when the strips 34 assume a predetermined position, for example the position shown in the drawing in FIG. 7*b*, that is to say when the observer 26 (FIG. 3) views the security element 2 under the viewing conditions determined by the predetermined tilt angle.

In FIG. 7*c*, after a further rotary movement about the tilt axis 28, the strips 34 on the pattern 4 (FIG. 1) are moved away from each other again, as is indicated by the arrows (not referenced) in FIG. 7*c*.

It will be appreciated that, in another embodiment, an adjacent arrangement of the first surface portion 31 and one of the other two surface portions 32, 33 is sufficient for the pattern 4 for orienting the security elements 2.

Without departing from the idea of the invention, the above-described embodiments of the pattern 4 are to be combined with each other, the appropriately shaped macrostructures M with the curved mirror surfaces and the matt structures are to be additively superimposed, and all the above-mentioned embodiments of the interface 11 (FIG. 6) are to be used.

The invention claimed is:

1. A security element for verifying a document, comprising a layer composite which is disposed in a reference plane defined by co-ordinate axes (x; y), wherein the layer composite comprises plastic material layers with embedded optically effective structures which form a pattern and which are shaped in surface portions of the pattern into a transparent shaping layer of the layer composite and form a reflecting interface embedded between the transparent shaping layer and a protective layer of the layer composite, wherein in at least one surface portion of dimensions in at least one direction of greater than 0.4 mm as an optically effective structure a three-dimensional surface of at least one macrostructure is shaped into the reflecting interface, which has adjacent extreme values which are at least 0.1 mm away from each other, wherein a structural height is limited to values below 40 μm, and the at least one macrostructure of the reflecting interface which is curved at least in partial regions is an at least portion-wise steady and differentiable function of the co-ordinates (x; y) and is not a periodic triangular or rectangular function.

2. A security element as set forth in claim 1, wherein the pattern comprises at least two adjacent surface portions, wherein a first macrostructure is shaped in a first surface portion, further wherein a second macrostructure is shaped in a second surface portion, wherein a gradient of the first macrostructure and a gradient of the second macrostructure are oriented in substantially parallel planes which contain a normal to a reference plane.

3. A security element as set forth in claim 1, wherein the at least one macrostructure is a portion-wise steady, differentiable function with a spatial frequency (F) of at most 20 lines/mm.

4. A security element as set forth in claim 1, wherein the macrostructure is a portion-wise steady, differentiable function of a surface structure of a relief image.

5. A security element as set forth in claim 1, wherein a macrostructure with a profile height which exceeds the structural height, is shaped into the shaping layer in the form of a shaping structure which is a result of a modulo function applied to a sum of the macrostructure and a function, wherein the function is dependent on the co-ordinates and is restricted in magnitude to half the structural height, and wherein the modulo function has an argument and a variation value which is less than the structural height.

6. A security element as set forth in claim 5, wherein the structural height is restricted to values below 5 micrometers and the variation value is in the range of between 0.5 micrometer and 4 micrometers.

7. A security element as set forth in claim 1, wherein additively superimposed on the at least one macrostructure is a submicroscopic diffraction grating with a relief profile, a function of the co-ordinates (x; y), wherein the relief profile comprises a spatial frequency (f) higher than 2400 lines/mm and a constant profile depth with a value in a range of between 0.05 micrometers and 5 micrometers, and wherein the submicroscopic diffraction grating, following the at least one macrostructure, retains the relief profile.

8. A security element as set forth in claim 1, wherein additively superimposed on the at least one macrostructure is a light-scattering matt structure with a relief profile, a function of the co-ordinates (x; y), wherein the matt structure has a mean roughness value $R_a$ in the range of between 200 nm and 5 μm, and wherein the matt structure, following the at least one macrostructure, retains the relief profile.

9. A security element as set forth in claim 1, wherein the reflecting interface is formed by a multi-layer interference layer.

10. A security element as set forth in claim 1, wherein the reflecting interface is formed by a full-area and/or structured, metallic reflection layer.

11. A security element as set forth in claim 1, wherein a cover layer of the layer composite is transparent and colored.

12. A security element as set forth in claim 1, wherein line elements and/or mosaic elements of another surface pattern with light-modifying structures surround the pattern, the light-modifying structures comprising at least one of a flat mirror surface, a microscopic grating structure and a matt structure.

* * * * *